(12) United States Patent
Ando et al.

(10) Patent No.: US 11,359,104 B2
(45) Date of Patent: Jun. 14, 2022

(54) INK COMPOSITION

(71) Applicant: Seiko Epson Corporation, Tokyo (JP)

(72) Inventors: Keigo Ando, Matsumoto (JP); Mami Tojino, Shiojiri (JP)

(73) Assignee: Seiko Epson Corporation

( * ) Notice: Subject to any disclaimer, the term of this patent is extended or adjusted under 35 U.S.C. 154(b) by 484 days.

(21) Appl. No.: 16/547,637

(22) Filed: Aug. 22, 2019

(65) Prior Publication Data
US 2020/0062980 A1    Feb. 27, 2020

(30) Foreign Application Priority Data

Aug. 23, 2018 (JP) .............................. JP2018-156214

(51) Int. Cl.
| | |
|---|---|
| *C09D 11/38* | (2014.01) |
| *C09D 11/102* | (2014.01) |
| *C09D 11/033* | (2014.01) |
| *C09D 11/322* | (2014.01) |

(52) U.S. Cl.
CPC ............ *C09D 11/38* (2013.01); *C09D 11/033* (2013.01); *C09D 11/102* (2013.01); *C09D 11/322* (2013.01)

(58) Field of Classification Search
CPC ..... C09D 11/38; C09D 11/102; C09D 11/033; C09D 11/322
See application file for complete search history.

(56) References Cited

U.S. PATENT DOCUMENTS

| | | |
|---|---|---|
| 2005/0054751 A1 | 3/2005 | Namba et al. |
| 2008/0070008 A1 | 3/2008 | Namba et al. |
| 2015/0299486 A1 | 10/2015 | Ootsuka et al. |

FOREIGN PATENT DOCUMENTS

| | | |
|---|---|---|
| JP | 2003-335987 A | 11/2003 |
| JP | 2006-316243 A | 11/2006 |
| JP | 2015-214686 A | 12/2015 |

*Primary Examiner* — Patrick D Niland
(74) *Attorney, Agent, or Firm* — Harness, Dickey & Pierce, P.L.C.

(57) ABSTRACT

An ink composition includes resin particles, one or more surfactants, one or more water-soluble organic solvents, and a glycol ether, where: the surfactants include a fluorosurfactant having a predetermined structure and an HLB value determined by Griffin's method of 11 or less; the water-soluble organic solvents include one or more selected from the group consisting of glycerin, ethylene glycol, diethylene glycol, polyethylene glycol having a weight-average molecular weight of 10,000 or less, 1,3-propanediol, 1,4-butanediol, and diglycerol; and the glycol ether has a predetermined structure and an HLB value determined by Griffin's method of 11 or less.

5 Claims, No Drawings

INK COMPOSITION

The present application is based on, and claims priority from, JP Application Serial Number 2018-156214, filed Aug. 23, 2018, the disclosure of which is hereby incorporated by reference herein in its entirety.

BACKGROUND

1. Technical Field

The present disclosure relates to an ink composition.

2. Related Art

An ink jet recording method enables recording of high-resolution images by using a relatively simple apparatus and thus has been developing rapidly in various fields. To provide an ink that can achieve both scratch resistance and optical density of images at high levels, JP-A-2015-214686, for example, discloses an ink containing a pigment dispersed with a polymer dispersant, polymer particles, one or more surfactants, one or more water-soluble organic solvents, and water, where: the amount of an anionic functional group on the surface of the polymer particles is 0.2 mmol/g or less; the surfactants include a fluorosurfactant having a low molecular weight due to a predetermined structure and an HLB value determined by Griffin's method of 11 or less; and the water-soluble organic solvents include at least one of the water-soluble organic solvents selected from a predetermined group.

In recent years, however, low-molecular-weight fluorosurfactants have not been suitable from the viewpoint of suppressing the emission of volatile compounds. Meanwhile, there is a possibility of a high-molecular-weight fluorosurfactant increasing dynamic surface tension in a high-frequency region, thereby impairing discharge stability.

SUMMARY

The present inventors performed intensive investigations to resolve the above-mentioned problems and as a result found that the above-mentioned problems can be resolved by using a predetermined fluorosurfactant and glycol ether together, thereby accomplishing the present disclosure.

Specifically, an ink composition according to the present disclosure includes resin particles, one or more surfactants, one or more water-soluble organic solvents, and a glycol ether, where: the surfactants include a fluorosurfactant that is represented by general formula (1) and that has an HLB value determined by Griffin's method of 11 or less; the water-soluble organic solvents include one or more selected from the group consisting of glycerin, ethylene glycol, diethylene glycol, polyethylene glycol having a weight-average molecular weight of 10,000 or less, 1,3-propanediol, 1,4-butanediol, and diglycerol; and the glycol ether is represented by general formula (2) and has an HLB value determined by Griffin's method of 11 or less.

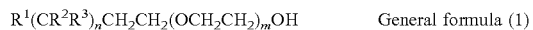
$$R^1(CR^2R^3)_nCH_2CH_2(OCH_2CH_2)_mOH \qquad \text{General formula (1)}$$

where $R^1$ is a fluorine atom or a hydrogen atom, $R^2$ and $R^3$ are each independently a fluorine atom or a hydrogen atom, at least one of $R^2$ and $R^3$ is a fluorine atom, n is 10 or more and 30 or less, and m is 20 or more and 60 or less.

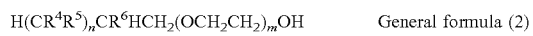
$$H(CR^4R^5)_nCR^6HCH_2(OCH_2CH_2)_mOH \qquad \text{General formula (2)}$$

where $R^4$, $R^5$, and $R^6$ are each independently a hydrogen atom or an alkyl group; n is 2 or more and 4 or less; and m is 1 or 2.

DESCRIPTION OF EXEMPLARY EMBODIMENTS

Hereinafter, embodiments of the present disclosure (hereinafter, referred to as "present embodiments") will be described in detail. The present disclosure, however, is not limited to these embodiments, and various modifications are possible without departing from the gist of the present disclosure.

Ink Composition

An ink composition according to the present embodiment includes resin particles, one or more surfactants, one or more water-soluble organic solvents, and a glycol ether, where: the surfactants include a fluorosurfactant that is represented by general formula (1) and that has an HLB value determined by Griffin's method of 11 or less; the water-soluble organic solvents include one or more selected from the group consisting of glycerin, ethylene glycol, diethylene glycol, polyethylene glycol having a weight-average molecular weight of 10,000 or less, 1,3-propanediol, 1,4-butanediol, and diglycerol; and the glycol ether is represented by general formula (2) and has an HLB value determined by Griffin's method of 11 or less.

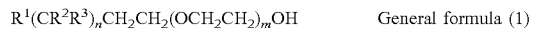
$$R^1(CR^2R^3)_nCH_2CH_2(OCH_2CH_2)_mOH \qquad \text{General formula (1)}$$

where $R^1$ is a fluorine atom or a hydrogen atom, $R^2$ and $R^3$ are each independently a fluorine atom or a hydrogen atom, at least one of $R^2$ and $R^3$ is a fluorine atom, n is 10 or more and 30 or less, and m is 20 or more and 60 or less.

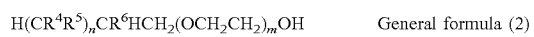
$$H(CR^4R^5)_nCR^6HCH_2(OCH_2CH_2)_mOH \qquad \text{General formula (2)}$$

where $R^4$, $R^5$, and $R^6$ are each independently a hydrogen atom or an alkyl group; n is 2 or more and 4 or less; and m is 1 or 2.

In the present embodiment, both suppressed emission of volatile compounds and enhanced discharge stability can be achieved by using the above-described fluorosurfactant and the above-described glycol ether. An ink composition according to the present embodiment may contain water, other additives, or the like, in addition to each of the above-mentioned components. Hereinafter, each component will be described in detail.

Resin Particles

The resin particles are not particularly limited, and examples include urethane resin particles, acrylic resin particles, and other resin particles. Among these resin particles, urethane resin particles or acrylic resin particles are preferable. By using these resin particles, scratch resistance of resulting recorded items tends to be further enhanced.

Acrylic Resin Particles

An acrylic resin is not particularly limited to a homopolymer or a copolymer provided that a resin includes a monomer derived from (meth)acrylic acid or a (meth)acrylic ester. Examples of monomers that constitute the acrylic resin encompass: monomers that form hydrophilic units including, for example, carboxy group-containing monomers, such as (meth)acrylic acid, itaconic acid, maleic acid, and fumaric acid; sulfonic acid group-containing monomers, such as styrenesulfonic acid; phosphonic acid group-containing monomers, such as 2-(meth)acryloyloxyethylphosphonic acid; anionic monomers, such as anhydrides or salts of these acidic monomers; and hydroxy group-containing monomers, such as 2-hydroxyethyl (meth)acrylate and 3-hydroxypropyl (meth)acrylate, and monomers that form hydrophobic units including, for example, aromatic ring-containing monomers, such as styrene, α-methylstyrene, and benzyl (meth)acrylate; and aliphatic group-containing monomers, such as ethyl (meth)acrylate, methyl (meth)acrylate, (iso) propyl (meth)acrylate, (n-, iso, tert-)butyl (meth)acrylate, and 2-ethylhexyl (meth)acrylate. The acrylic resin preferably includes hydrophilic units derived from an anionic monomer. Examples of a cation that constitutes a salt of the anionic monomer include lithium ions, sodium ions, potassium ions, ammonium ions, and organic ammonium ions.

Among such resins, an acrylic resin including at least hydrophilic units derived from (meth)acrylic acid and hydrophobic units derived from an aromatic ring-containing monomer, such as styrene, α-methylstyrene, or benzyl (meth)acrylate, is preferable.

The content of acrylic resin particles is preferably 0.3 to 3% by mass, more preferably 0.5 to 1.5% by mass, and further preferably 0.75 to 1.25% by mass based on the total amount of the ink composition. When the content of the acrylic resin falls within the above-mentioned ranges, scratch resistance and optical density of resulting recorded items tend to be further enhanced.

Urethane Resins

The urethane resin is not particularly limited provided that a resin includes urethane linkages. Examples include a resin obtained by reacting a polyisocyanate and a polyol, a resin obtained by reacting such a polyisocyanate-polyol resin with a chain extender, and a hybrid resin of a urethane resin bonded with another resin.

The polyisocyanate is not particularly limited, and examples include aliphatic polyisocyanates, such as tetramethylene diisocyanate, hexamethylene diisocyanate, and 2,2,4-trimethylhexamethylene diisocyanate; alicyclic polyisocyanates, such as isophorone diisocyanate and 1,4-cyclohexane diisocyanate; aromatic polyisocyanates, such as tolylene diisocyanate, xylylene diisocyanate, and 1,4-phenylene diisocyanate; and aromatic-aliphatic polyisocyanates, such as α,α,α',α'-tetramethylxylylene diisocyanate.

The polyol is not particularly limited, and examples include polyester polyols, polyether polyols, polycarbonate polyols, and polyols having acid groups. From the viewpoint of enabling suppressed hydrolysis of a urethane resin and enhanced image glossiness even after long-term storage of an ink, a urethane resin synthesized by using a polyether polyol is preferable. Moreover, from the viewpoint of enhancing affinity of a urethane resin for water, a urethane resin may have an acid group, such as a carboxy group, a sulfonic acid group, or a phosphonic acid group and/or a hydrophilic group, such as a carbonyl group or a hydroxy group. In particular, a urethane resin synthesized by using a polyol having an acid group, such as dimethylolpropionic acid or dimethylolbutanoic acid, is preferable. Such an acid group may be in the form of a salt, and examples of a cation that constitutes the salt includelithium ions, sodium ions, potassium ions, ammonium ions, and organic ammonium ions.

The chain extender is a compound that reacts with residual isocyanate groups that have not yet formed urethane linkages in polyisocyanate units of a urethane prepolymer obtained by reacting a polyisocyanate and a polyol. Such a chain extender is not particularly limited, and examples include polyamines, such as ethylenediamine, and diethylenetriamine; polyimines, such as polyethylenimine; and polyhydric alcohols, such as neopentyl glycol and butylethylpropanediol. It is particularly preferable to use a water-soluble urethane resin synthesized by using a polyhydric alcohol, especially neopentyl glycol, as a chain extender. Since a water-soluble urethane resin synthesized by using a polyhydric alcohol, such as neopentyl glycol, as a chain extender lacks cationic portions in its structure, image glossiness tends to be further enhanced.

The weight-average molecular weight of the urethane resin is preferably 5,000 to 100,000 and more preferably 5,000 to 15,000. In addition, the acid value of the urethane resin is preferably 10 to 110 mgKOH/g. Further, the acid value of the urethane resin is preferably lower than the acid value of the above-described acrylic resin.

The content of urethane resin particles is preferably 0.3 to 3% by mass, more preferably 0.5 to 1.5% by mass, and further preferably 0.75 to 1.25% by mass based on the total amount of the ink composition. When the content of the urethane resin falls within the above-mentioned ranges, scratch resistance and optical density of resulting recorded items tend to be further enhanced.

Further, resin particles used in the present embodiment preferably include resin particles having a predetermined amount of a surface anionic functional group. The amount of a surface anionic functional group of such resin particles is preferably 0.2 mmol/g or less, more preferably 0.05 to 0.2 mmol/g, and further preferably 0.05 to 0.1 mmol/g. When the amount of an anionic functional group on the surface of the resin particles is 0.2 mmol/g or less, scratch resistance and optical density of resulting recorded items tend to be further enhanced. Meanwhile, when the amount of an anionic functional group on the surface of the resin particles is 0.05 mmol/g or more, dispersion stability of the resin particles tends to be further enhanced.

The other resin is not particularly limited, and examples include vinyl acetate resins, vinyl chloride resins, butadiene resins, styrene resins, polyester resins, crosslinked styrene resins, benzoguanamine resins, phenolic resins, silicone resins, epoxy resins, paraffin resins, fluororesins, water-soluble resins, and copolymers of combined monomers that constitute these resins.

The total content of resin particles is preferably 0.3 to 3% by mass, more preferably 0.5 to 1.5% by mass, and further preferably 0.75 to 1.25% by mass based on the total amount of the ink composition. When the total content of resin particles falls within the above-mentioned ranges, scratch resistance and optical density of resulting recorded items tend to be further enhanced.

Surfactants

The surfactants include a fluorosurfactant that is represented by general formula (1) and that has an HLB value determined by Griffin's method of 11 or less. Other surfactants may also be included as necessary. Here, the glycol ether described hereinafter is not included in the surfactants in the present embodiment.

$$R^1(CR^2R^3)_nCH_2CH_2(OCH_2CH_2)_mOH \qquad \text{General formula (1)}$$

where $R^1$ is a fluorine atom or a hydrogen atom, $R^2$ and $R^3$ are each independently a fluorine atom or a hydrogen atom, at least one of $R^2$ and $R^3$ is a fluorine atom, n is 10 or more and 30 or less, and m is 20 or more and 60 or less.

The above-described fluorosurfactant includes a fluoroalkyl chain and a polyalkylene oxide chain. The chain length n of the fluoroalkyl chain is 10 to 30 and preferably to 30. The chain length m of the polyalkylene oxide chain is 20 to 60 and preferably 40 to 60. By using such a fluorosurfactant with a glycol ether together, the emission of volatile compounds tends to be further suppressed and discharge stability tends to be further enhanced.

The HLB value of the fluorosurfactant is 11 or less, preferably 10.5 or less, and further preferably 10 or less. Meanwhile, the lower limit of the HLB value of the fluorosurfactant is not particularly limited but is 8 or more. In the present embodiment, an HLB value is a value determined by Griffin's method. When the HLB value is 11 or less, wettability of recording media tends to be further enhanced and scratch resistance and optical density of resulting recorded items tend to be further enhanced.

The content of the above-described fluorosurfactant is preferably 0.01% by mass or more and 3% by mass or less and more preferably 0.1% by mass or more and 1% by mass or less based on the total amount of the ink composition. When the content of the fluorosurfactant falls within the above-mentioned ranges, the emission of volatile compounds tends to be further suppressed and discharge stability tends to be further enhanced.

Further, other surfactants are not particularly limited and examples include acetylenic glycol surfactants and silicone surfactants.

The acetylenic glycol surfactants are not particularly limited but are preferably one or more selected from 2,4,7,9-tetramethyl-5-decyne-4,7-diol, an alkylene oxide adduct of 2,4,7,9-tetramethyl-5-decyne-4,7-diol, 2,4-dimethyl-5-decyne-4-ol, and an alkylene oxide adduct of 2,4-dimethyl-5-decyne-4-ol, for example. Commercial products of the acetylenic glycol surfactants are not particularly limited, and examples include Olfine 104 series and Olfine E series, such as Olfine E1010, Surfynol 465, and Surfynol 61 (trade names, from Nissin Chemical Industry Co., Ltd.). Such acetylenic glycol surfactants may be used alone or in combination.

Examples of the silicone surfactants include polysiloxane compounds and polyether-modified organosiloxanes. Commercial products of the silicone surfactants are not particularly limited, and specific examples include BYK-306, BYK-307, BYK-333, BYK-341, BYK-345, BYK-346, BYK-347, BYK-348, and BYK-349 (trade names, from BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, from Shin-Etsu Chemical Co., Ltd.).

The total content of surfactants is preferably 0.01% by mass or more and 3% by mass or less and more preferably 0.1% by mass or more and 1% by mass or less based on the total amount of the ink composition. When the total content of the surfactants falls within the above-mentioned ranges, discharge stability tends to be further enhanced.

Glycol Ethers

The glycol ether is represented by general formula (2) and has an HLB value determined by Griffin's method of 11 or less.

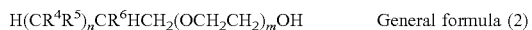

$$H(CR^4R^5)_nCR^6HCH_2(OCH_2CH_2)_mOH \qquad \text{General formula (2)}$$

where $R^4$, $R^5$, and $R^6$ are each independently a hydrogen atom or an alkyl group; n is 2 or more and 4 or less; and m is 1 or 2.

The glycol ether includes an alkyl chain and a polyalkylene oxide chain. The chain length n of the alkyl chain is 2 to 4 and preferably 2 to 3. The chain length m of the polyalkylene oxide chain is 1 to 2 and preferably 1. When such a glycol ether is used together with a fluorosurfactant, the emission of volatile compounds tends to be further suppressed and discharge stability tends to be further enhanced.

The HLB value of the glycol ether is 11 or less, preferably 10.5 or less, and further preferably 10 or less. Meanwhile, the lower limit of the HLB value of the glycol ether is not particularly limited but is 8 or more. In the present embodiment, the HLB value is a value determined by Griffin's method. When the HLB value is 11 or less, discharge stability tends to be further enhanced.

The content of the glycol ether is preferably 0.01% by mass or more and 1% by mass or less and more preferably 0.1% by mass or more and 1% by mass or less based on the total amount of the ink composition. When the content of the glycol ether falls within the above-mentioned ranges, the emission of volatile compounds tends to be further suppressed and discharge stability tends to be further enhanced.

The ratio of the glycol ether content to the fluorosurfactant content is preferably 7.5 to 20, more preferably 7.5 to 15, and further preferably 7.5 to 12.5. When the ratio of the glycol ether content to the fluorosurfactant content falls within the above-mentioned ranges, the emission of volatile compounds tends to be further suppressed and discharge stability tends to be further enhanced.

Water

The content of water is preferably 50 to 80% by mass, more preferably 55 to 75% by mass, and further preferably 60 to 70% by mass based on the total amount of the ink composition.

Water-Soluble Organic Solvents

The water-soluble organic solvents include one or more selected from the group consisting of glycerin, ethylene glycol, diethylene glycol, polyethylene glycol having a weight-average molecular weight of 10,000 or less, 1,3-propanediol, 1,4-butanediol, and diglycerol. Other water-soluble organic solvents may also be included as necessary. In the present embodiment, the water-soluble organic solvents exclude the above-described glycol ethers.

The total content of one or more water-soluble organic solvents selected from the group consisting of glycerin, ethylene glycol, diethylene glycol, polyethylene glycol having a weight-average molecular weight of 10,000 or less, 1,3-propanediol, 1,4-butanediol, and diglycerol is preferably 5 to 35% by mass, more preferably 10 to 30% by mass, and further preferably 15 to 25% by mass based on the total amount of the ink composition. When the content of the water-soluble organic solvents falls within the above-mentioned ranges, scratch resistance and optical density of resulting recorded items tend to be further enhanced.

Other water-soluble organic solvents are not particularly limited, and specific examples include alcohols and glycols, such as propylene glycol, dipropylene glycol, 1,2-butanediol, 1,2-pentanediol, 1,2-hexanediol, 1,5-pentanediol, 1,6-hexanediol, diethylene glycol mono-n-propyl ether, ethylene glycol monoisopropyl ether, diethylene glycol monoisopropyl ether, ethylene glycol mono-n-butyl ether, ethylene glycol mono-tert-butyl ether, diethylene glycol mono-n-butyl ether, triethylene glycol monobutyl ether, diethylene glycol mono-tert-butyl ether, propylene glycol monomethyl ether, propylene glycol monoethyl ether, propylene glycol mono-tert-butyl ether, propylene glycol mono-n-propyl ether, propylene glycol monoisopropyl ether, propylene glycol mono-n-butyl ether, dipropylene glycol mono-n-butyl ether, dipropylene glycol mono-n-propyl ether, dipropylene glycol monoisopropyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, and isopropyl alcohol. These organic solvents may be used alone or in combination.

The total content of water-soluble organic solvents is preferably 5 to 35% by mass, more preferably 10 to 30% by mass, and further preferably 15 to 25% by mass based on the total amount of the ink composition.

Other Components

The ink composition of the present embodiment may further contain, as necessary, various additives, such as dissolution aids, viscosity adjusters, pH adjusters, antioxidants, preservatives, fungicides, corrosion inhibitors, and chelating agents for trapping metal ions that affect dispersion.

Ink Jet Recording Method

The ink jet recording method of the present embodiment includes an attaching step of discharging the above-described ink composition from an ink jet head, thereby attaching the ink onto a recording medium. With this method, the emission of volatile compounds is further suppressed and discharge stability is further enhanced. Here, the ink jet head is a head that performs recording by discharging an ink composition toward a recording medium. Such a head includes a cavity for discharging an ink composition housed therein from a nozzle, a discharge driving section that applies a driving force for discharging to the ink composition, and a nozzle that discharges the ink composition outside the head. The discharge driving section may be formed by using an electromechanical conversion element, such as a piezoelectric element, that changes the cavity volume through mechanical deformation and/or a thermoelectric conversion element that generates heat to form bubbles in an ink, thereby discharging the ink.

EXAMPLES

Hereinafter, the present disclosure will be specifically described with reference to Examples and Comparative Examples. The present disclosure, however, is not limited whatsoever by the following Examples.

Materials for Ink Compositions

Main materials for ink compositions of the Examples and Comparative Examples below are as follows.

Colorant
  Pigment (C.I. Pigment Yellow 74)
Resin Particles
  Resin particles A (urethane resin particles; from DKS Co. Ltd.; product name: SF-300; amount of surface anionic functional group: 0.032 mmol/g)
  Resin particles B (urethane resin particles; from Taisei Fine Chemical Co., Ltd.; product name: WBR-016U; amount of surface anionic functional group: 0.21 mmol/g)
  Resin particles C (urethane resin particles; from Mitsui Chemicals, Inc.; product name: W-5661; amount of surface anionic functional group: 0.39 mmol/g)
Surfactants
  Fluorosurfactant A (n=18, m=20, HLB value: 10.0)
  Fluorosurfactant B (n=18, m=24, HLB value: 10.9)
  Fluorosurfactant C (n=18, m=30, HLB value: 12.0)
  Fluorosurfactant D (n=30, m=41, HLB value: 11.0)
  Fluorosurfactant E (n=5, m=5, HLB value: 9.9)
  Structure of fluorosurfactants: $F(CF_2)_nCH_2CH_2(OCH_2CH_2)_mOH$
Glycol Ethers
  Glycol ether A: hexyl glycol, n=2, m=1, HLB=8.4
  Glycol ether B: hexyl diglycol, n=2, m=1, HLB=10.6
  Glycol ether C: butyl diglycol, n=2, m=2, HLB=12.5
  Glycol ether D: triethylene glycol monododecyl ether, n=10, m=3, HLB=8.9
Water-Soluble Organic Solvents
  Group A: glycerin, ethylene glycol, diethylene glycol, polyethylene glycol having a weight-average molecular weight of 6,000, 1,3-propanediol, 1,4-butanediol, and diglycerol
  Non-group A: propylene glycol Exemplary Synthesis of Surfactants A synthetic method for the above-mentioned fluorosurfactants A to E will be described. A perfluoroalkyl iodide (RfI) is obtained through a telomerization process by radically polymerizing a perfluoroolefin ($CF_2$=$CF_2$ or the like) while using a perfluoroalkyl iodide ($CF_3I$, $C_2F_5I$, $(CF_3)_2CFI$, or the like) as a telogen. The obtained perfluoroalkyl iodide (RfI) is radically added to allyl alcohol, and hydrogenated to yield an alcohol compound ($Rf(CH_2)_3OH$). The resulting alcohol is reacted in DMF solvent with IBX (2-iodoxybenzoic acid) and iodine under an oxygen atmosphere to yield a carboxylic acid having one less carbon. The resulting carboxylic acid is reduced to yield an alcohol. The obtained alcohol is then subjected to Williamson ether synthesis with a protected alcohol having a leaving group at the end, followed by deprotection to yield fluorosurfactants A to E.

Preparation of Ink Compositions

The respective materials are mixed in the composition shown in Tables 1 and 2 below and stirred sufficiently to yield each ink composition. Specifically, each ink is prepared by uniformly mixing the respective materials. In Tables 1 and 2 below, the unit of the numerical values is % by mass, and the total is 100.0% by mass.

TABLE 1

|  |  |  | Example | | | | | | |
|---|---|---|---|---|---|---|---|---|---|
|  |  | Substance name (product name) | 1 | 2 | 3 | 4 | 5 | 6 | 7 |
| Pigment | Pigment dispersed by resin | C.I. Pigment Yellow 74 | 4.0 | 4.0 | 4.0 | 4.0 | 4.0 | 4.0 | 4.0 |
| Resin particles | Resin particles A | SF-300 | 1.0 | 1.0 | 1.0 | 1.0 | 1.0 | 0 | 0 |
|  | Resin particles B | WBR-016U | 0 | 0 | 0 | 0 | 0 | 1.0 | 0 |
|  | Resin particles C | W-5661 | 0 | 0 | 0 | 0 | 0 | 0 | 1.0 |
| Surfactant | Fluorosurfactant A | n = 18 m = 20 HLB value: 10.0 | 1.0 | 0 | 0 | 1.0 | 1.0 | 1.0 | 1.0 |
|  | Fluorosurfactant B | n = 18 m = 24 HLB value: 10.9 | 0 | 0 | 1.0 | 0 | 0 | 0 | 0 |
|  | Fluorosurfactant C | n = 18 m = 30 HLB value: 12.0 | 0 | 0 | 0 | 0 | 0 | 0 | 0 |
|  | Fluorosurfactant D | n = 30 m = 41 HLB value: 11.0 | 0 | 0.1 | 0 | 0 | 0 | 0 | 0 |
|  | Fluorosurfactant E | n = 5 m = 5 HLB value: 9.9 | 0 | 0 | 0 | 0 | 0 | 0 | 0 |
| Glycol ether | Glycol ether A | Hexyl glycol | 0.1 | 0.1 | 0.1 | 0 | 0.1 | 0.1 | 0.1 |
|  | Glycol ether B | Hexyl diglycol | 0 | 0 | 0 | 0.1 | 0 | 0 | 0 |
|  | Glycol ether C | Butyl diglycol | 0 | 0 | 0 | 0 | 0 | 0 | 0 |
|  | Glycol ether D | Triethylene glycol monododecyl ether | 0 | 0 | 0 | 0 | 0 | 0 | 0 |

TABLE 1-continued

| | | | | | | | | | | |
|---|---|---|---|---|---|---|---|---|---|---|
| Water-soluble organic solvent | Group A | | Glycerin | 20.0 | 20.0 | 20.0 | 20.0 | 20.0 | 20.0 | 20.0 |
| | | | Ethylene glycol | 0 | 0 | 0 | 0 | 0 | 0 | 0 |
| | | | Diethylene glycol | 0 | 0 | 0 | 0 | 0 | 0 | 0 |
| | | | Polyethylene glycol (weight-average molecular weight 6,000) | 0 | 0 | 0 | 0 | 0 | 0 | 0 |
| | | | 1,3-Propanediol | 0 | 0 | 0 | 0 | 0 | 0 | 0 |
| | | | 1,4-Butanediol | 0 | 0 | 0 | 0 | 0 | 0 | 0 |
| | | | Diglycerol | 0 | 0 | 0 | 0 | 0 | 0 | 0 |
| | Non-group A | | Propylene glycol | 0 | 0 | 0 | 0 | 0 | 0 | 0 |
| Deionized water | | | | 73.9 | 74.8 | 73.9 | 73.9 | 74.0 | 73.9 | 73.9 |
| Evaluation | Scratch resistance of images | | | A | A | B | A | A | B | B |
| | Discharge stability | | | A | A | A | B | B | A | A |
| | VOC Emission | | | B | A | B | B | B | B | B |

| | | | | Example | | | | |
|---|---|---|---|---|---|---|---|---|
| | | | Substance name (product name) | 8 | 9 | 10 | 11 | 12 |
| Pigment | Pigment dispersed by resin | | C.I. Pigment Yellow 74 | 4.0 | 4.0 | 4.0 | 4.0 | 4.0 |
| Resin particles | Resin particles A | | SF-300 | 0.5 | 1.0 | 1.0 | 1.0 | 1.0 |
| | Resin particles B | | WBR-016U | 0 | 0 | 0 | 0 | 0 |
| | Resin particles C | | W-5661 | 0 | 0 | 0 | 0 | 0 |
| Surfactant | Fluorosurfactant A | | n = 18 m = 20 HLB value: 10.0 | 1.0 | 0 | 0 | 0 | 0 |
| | Fluorosurfactant B | | n = 18 m = 24 HLB value: 10.9 | 0 | 0 | 0 | 0 | 0 |
| | Fluorosurfactant C | | n = 18 m = 30 HLB value: 12.0 | 0 | 0 | 0 | 0 | 0 |
| | Fluorosurfactant D | | n = 30 m = 41 HLB value: 11.0 | 0 | 0.1 | 0.1 | 0.1 | 0.1 |
| | Fluorosurfactant E | | n = 5 m = 5 HLB value: 9.9 | 0 | 0 | 0 | 0 | 0 |
| Glycol ether | Glycol ether A | | Hexyl glycol | 0.1 | 0.1 | 0.1 | 0.1 | 0.1 |
| | Glycol ether B | | Hexyl diglycol | 0 | 0 | 0 | 0 | 0 |
| | Glycol ether C | | Butyl diglycol | 0 | 0 | 0 | 0 | 0 |
| | Glycol ether D | | Triethylene glycol monododecyl ether | 0 | 0 | 0 | 0 | 0 |
| Water-soluble organic solvent | Group A | | Glycerin | 20.0 | 0 | 0 | 0 | 0 |
| | | | Ethylene glycol | 0 | 20.0 | 0 | 0 | 0 |
| | | | Diethylene glycol | 0 | 0 | 20.0 | 0 | 0 |
| | | | Polyethylene glycol (weight-average molecular weight 6,000) | 0 | 0 | 0 | 20.0 | 0 |
| | | | 1,3-Propanediol | 0 | 0 | 0 | 0 | 20.0 |
| | | | 1,4-Butanediol | 0 | 0 | 0 | 0 | 0 |
| | | | Diglycerol | 0 | 0 | 0 | 0 | 0 |
| | Non-group A | | Propylene glycol | 0 | 0 | 0 | 0 | 0 |
| Deionized water | | | | 74.4 | 74.8 | 74.8 | 74.8 | 74.8 |
| Evaluation | Scratch resistance of images | | | B | A | A | A | A |
| | Discharge stability | | | A | A | A | A | A |
| | VOC Emission | | | B | A | A | A | A |

TABLE 2

| | | | | Example | | | Comparative Example | | |
|---|---|---|---|---|---|---|---|---|---|
| | | | Substance name (product name) | 13 | 14 | 15 | 1 | 2 | 3 |
| Pigment | Pigment dispersed by resin | | C.I. Pigment Yellow 74 | 4.0 | 4.0 | 4.0 | 4.0 | 4.0 | 4.0 |
| Resin particles | Resin particles A | | SF-300 | 1.0 | 1.0 | 1.0 | 0 | 1.0 | 1.0 |
| | Resin particles B | | WBR-016U | 0 | 0 | 0 | 0 | 0 | 0 |
| | Resin particles C | | W-5661 | 0 | 0 | 0 | 0 | 0 | 0 |
| Surfactant | Fluorosurfactant A | | n = 18 m = 20 HLB value: 10.0 | 0 | 0 | 0 | 1.0 | 1.0 | 1.1 |
| | Fluorosurfactant B | | n = 18 m = 24 HLB value: 10.9 | 0 | 0 | 0 | 0 | 0 | 0 |
| | Fluorosurfactant C | | n = 18 m = 30 HLB value: 12.0 | 0 | 0 | 0 | 0 | 0 | 0 |
| | Fluorosurfactant D | | n = 30 m = 41 HLB value: 11.0 | 0.1 | 0.1 | 0.1 | 0 | 0 | 0 |
| | Fluorosurfactant E | | n = 5 m = 5 HLB value: 9.9 | 0 | 0 | 0 | 0 | 0 | 0 |
| Glycol ether | Glycol ether A | | Hexyl glycol | 0.1 | 0.1 | 0.1 | 0.1 | 0 | 0 |
| | Glycol ether B | | Hexyl diglycol | 0 | 0 | 0 | 0 | 0 | 0 |
| | Glycol ether C | | Butyl diglycol | 0 | 0 | 0 | 0 | 0.1 | 0 |
| | Glycol ether D | | Triethylene glycol monododecyl ether | 0 | 0 | 0 | 0 | 0 | 0 |
| Water-soluble organic solvent | Group A | | Glycerin | 0 | 0 | 10.0 | 20.0 | 20.0 | 20.0 |
| | | | Ethylene glycol | 0 | 0 | 10.0 | 0 | 0 | 0 |
| | | | Diethylene glycol | 0 | 0 | 0 | 0 | 0 | 0 |
| | | | Polyethylene glycol (weight-average molecular weight 6,000) | 0 | 0 | 0 | 0 | 0 | 0 |
| | | | 1,3-Propanediol | 0 | 0 | 0 | 0 | 0 | 0 |
| | | | 1,4-Butanediol | 20.0 | 0 | 0 | 0 | 0 | 0 |
| | | | Diglycerol | 0 | 20.0 | 0 | 0 | 0 | 0 |
| | Non-group A | | Propylene glycol | 0 | 0 | 0 | 0 | 0 | 0 |
| Deionized water | | | | 74.8 | 74.8 | 74.8 | 74.9 | 73.9 | 73.9 |

TABLE 2-continued

| Evaluation | Scratch resistance of images | | A | A | A | C | A | A |
|---|---|---|---|---|---|---|---|---|
| | Discharge stability | | A | A | A | A | C | C |
| | VOC Emission | | A | A | A | B | B | B |

| | | | Comparative Example | | | | |
|---|---|---|---|---|---|---|---|
| | | Substance name (product name) | 4 | 5 | 6 | 7 | 8 |
| Pigment | Pigment dispersed by resin | C.I. Pigment Yellow 74 | 4.0 | 4.0 | 4.0 | 4.0 | 4.0 |
| Resin particles | Resin particles A | SF-300 | 1.0 | 1.0 | 1.0 | 1.0 | 1.0 |
| | Resin particles B | WBR-016U | 0 | 0 | 0 | 0 | 0 |
| | Resin particles C | W-5661 | 0 | 0 | 0 | 0 | 0 |
| Surfactant | Fluorosurfactant A | n = 18 m = 20 HLB value: 10.0 | 1.0 | 0 | 0 | 0 | 1.0 |
| | Fluorosurfactant B | n = 18 m = 24 HLB value: 10.9 | 0 | 0 | 0 | 0 | 0 |
| | Fluorosurfactant C | n = 18 m = 30 HLB value: 12.0 | 0 | 0 | 0 | 1.0 | 0 |
| | Fluorosurfactant D | n = 30 m = 41 HLB value: 11.0 | 0 | 0 | 0 | 0 | 0 |
| | Fluorosurfactant E | n = 5 m = 5 HLB value: 9.9 | 0 | 1.0 | 0 | 0 | 0 |
| Glycol ether | Glycol ether A | Hexyl glycol | 0 | 0.1 | 1.0 | 0.1 | 0.1 |
| | Glycol ether B | Hexyl diglycol | 0 | 0 | 0 | 0 | 0 |
| | Glycol ether C | Butyl diglycol | 0 | 0 | 0 | 0 | 0 |
| | Glycol ether D | Triethylene glycol monododecyl ether | 0.1 | 0 | 0 | 0 | 0 |
| Water-soluble organic solvent | Group A | Glycerin | 20.0 | 20.0 | 20.0 | 20.0 | 0 |
| | | Ethylene glycol | 0 | 0 | 0 | 0 | 0 |
| | | Diethylene glycol | 0 | 0 | 0 | 0 | 0 |
| | | Polyethylene glycol (weight-average molecular weight 6,000) | 0 | 0 | 0 | 0 | 0 |
| | | 1,3-Propanediol | 0 | 0 | 0 | 0 | 0 |
| | | 1,4-Butanediol | 0 | 0 | 0 | 0 | 0 |
| | | Diglycerol | 0 | 0 | 0 | 0 | 0 |
| | Non-group A | Propylene glycol | 0 | 0 | 0 | 0 | 20.0 |
| Deionized water | | | 73.9 | 73.9 | 74.0 | 73.9 | 73.9 |
| Evaluation | Scratch resistance of images | | A | A | C | C | C |
| | Discharge stability | | C | A | A | A | A |
| | VOC Emission | | B | C | A | B | B |

Recording Method

Each ink composition prepared as described above was filled into a PX-G930 (from Seiko Epson Corp.) and discharged from an ink jet head toward an ink jet recording medium (glossy photo paper: model No. KA 450PSK (from Seiko Epson Corp.)) to print a solid image pattern at a duty of 100%.

Scratch Resistance

Each solid image pattern obtained as above was rubbed with white paper by using a color fastness rubbing tester AB-301 (from Tester Sangyo Co., Ltd.) under predetermined loading conditions (load: 500 g; reciprocating cycles: 50; white cotton rubbing cloth: Kanakin (muslin) No. 3), and the area ratio of the solid image pattern in which the ink was attached to the white cotton rubbing cloth was calculated. Scratch resistance was evaluated on the basis of the obtained area ratio and in accordance with the following criteria.

A: ratio of attached ink of 3% or less
B: ratio of attached ink of more than 3% and 5% or less
C: ratio of attached ink of more than 5%

Discharge Stability

By the above-described recording method, 10 layers of A4-sized solid image patterns were successively printed. The solid image patterns of the obtained recorded items were visually observed and evaluated for discharge stability in accordance with the following assessment criteria.

A: all ten layers of image samples without observed streaks or color unevenness
B: two layers or less of samples with observed streaks or color unevenness
C: more than two layers of samples with observed streaks or color unevenness Suppressed Emission of Volatile Compounds In the above-described recording method, the amount of emitted volatile compounds was measured in accordance with the Eco Mark product category No. 155 certification criteria "Imaging equipment such as copiers, printers, etc. (Version 1.2)" by the Japan Environment Association. Each ink composition was evaluated for suppressed emission of volatile compounds in accordance with the following assessment criteria.

A: amount of emitted volatile compounds of 5 mg/h or less
B: amount of emitted volatile compounds of more than 5 mg/h and 15 mg/h or less
C: amount of emitted volatile compounds of more than 15 mg/h

What is claimed is:

1. An ink composition comprising:
   resin particles;
   one or more surfactants;
   one or more water-soluble organic solvents; and
   a glycol ether, wherein:
   the surfactants include a fluorosurfactant that is represented by general formula (1) and that has an HLB value determined by Griffin's method of 11 or less;
   the water-soluble organic solvents include one or more selected from the group consisting of glycerin, ethylene glycol, diethylene glycol, polyethylene glycol having a weight-average molecular weight of 10,000 or less, 1,3-propanediol, 1,4-butanediol, and diglycerol; and
   the glycol ether is represented by general formula (2) and has an HLB value determined by Griffin's method of 11 or less,
   general formula (1) being: $R^1(CR^2R^3)_n CH_2CH_2(OCH_2CH_2)_m OH$
   wherein
   $R^1$ is a fluorine atom or a hydrogen atom, $R^2$ and $R^3$ are each independently a fluorine atom or a hydrogen atom, at least one of $R^2$ and $R^3$ is a fluorine atom, n is 10 or more and 30 or less, and m is 20 or more and 60 or less, general formula (2) being: $H(CR^4R^5)_nCR^6HCH_2(OCH_2CH_2)_mOH$ wherein $R^4$, $R^5$, and $R^6$ are each independently a hydrogen atom or an alkyl group; n is 2 or more and 4 or less; and m is 1 or 2.

2. The ink composition according to claim 1, wherein the resin particles include resin fine particles having a surface anionic functional group in an amount of 0.2 mmol/g or less.

3. The ink composition according to claim 1, wherein the glycol ether content is 0.1% by mass or more and 1% by mass or less based on a total amount of the ink composition.

4. The ink composition according to claim 1, wherein the resin particles include urethane resin particles or acrylic resin particles.

5. The ink composition according to claim 1, wherein the fluorosurfactant content is 0.1% by mass or more and 1% by mass or less based on a total amount of the ink composition.

* * * * *